(12) United States Patent
Pomeroy et al.

(10) Patent No.: US 7,283,735 B2
(45) Date of Patent: Oct. 16, 2007

(54) WINDSHIELD WIPER DISPENSER METHOD AND APPARATUS

(76) Inventors: Chris E. Pomeroy, 2435 Harksell Rd., Ferndale, WA (US) 98248; Brent A. Caldwell, 2453 S. Bakerview Park Dr., Ferndale, WA (US) 98248

( * ) Notice: Subject to any disclaimer, the term of this patent is extended or adjusted under 35 U.S.C. 154(b) by 0 days.

(21) Appl. No.: 11/313,516

(22) Filed: Dec. 21, 2005

(65) Prior Publication Data
US 2006/0162112 A1 Jul. 27, 2006

Related U.S. Application Data

(60) Provisional application No. 60/638,245, filed on Dec. 21, 2004.

(51) Int. Cl.
*A47J 27/00* (2006.01)

(52) U.S. Cl. ........................ 392/441; 392/447

(58) Field of Classification Search ............ None
See application file for complete search history.

(56) References Cited

U.S. PATENT DOCUMENTS

| | | | |
|---|---|---|---|
| 2,392,206 A * | 1/1946 | Wilken | 219/432 |
| 2,849,588 A * | 8/1958 | Marcuse | 392/444 |
| 3,594,849 A | 7/1971 | Coshow | |
| 4,000,835 A | 1/1977 | Bassett et al. | |
| 4,068,116 A | 1/1978 | McKinstry | |
| 4,143,792 A | 3/1979 | Rex | |
| 4,480,173 A | 10/1984 | Butterfield | |
| 4,759,470 A | 7/1988 | Jacobs | |
| 4,908,501 A * | 3/1990 | Arnold, III | 219/438 |
| 5,257,423 A | 11/1993 | Jacobsen et al. | |
| 5,999,700 A * | 12/1999 | Geers | 392/441 |
| 6,283,656 B1 | 9/2001 | Jiang | |
| 6,469,281 B1 * | 10/2002 | Reusche et al. | 219/438 |
| 6,484,907 B1 | 11/2002 | Evans | |
| 6,585,011 B2 | 7/2003 | Willeke, Jr. et al. | |

* cited by examiner

*Primary Examiner*—Thor S. Campbell
(74) *Attorney, Agent, or Firm*—Matthew W. Jellett; Hughes Law Firm, PLLC

(57) ABSTRACT

A windshield wiper solution dispenser located at vehicle servicing stations or fuel stations. The stations are usually located in geographic regions which are exposed to long periods of freezing temperatures. The solution dispenser is configured to maintain the solution within the dispenser in a liquid state during outside freezing temperatures. The dispenser has an interior region which contains the solution and also has a heater to keep the solution in a liquid state. A plurality of monitors or sensors are provided as well as temperature controlling mechanisms. In one embodiment the heater has a programmable logic device or controller to monitor the interior temperature and exterior temperatures as well as the solution liquid level and adjust the heater and the amount of solution contained in the dispenser as needed. The heater can be a coiled electrical resistance heater, an electrical liner heater, or a plurality of thermoelectric units which can be placed around the outside of the dispenser. The solution can be circulated through a gas heating source, as well as other environmentally friendly heating system such as solar powered panels and the like.

20 Claims, 10 Drawing Sheets

FIG. 3
FIG. 4
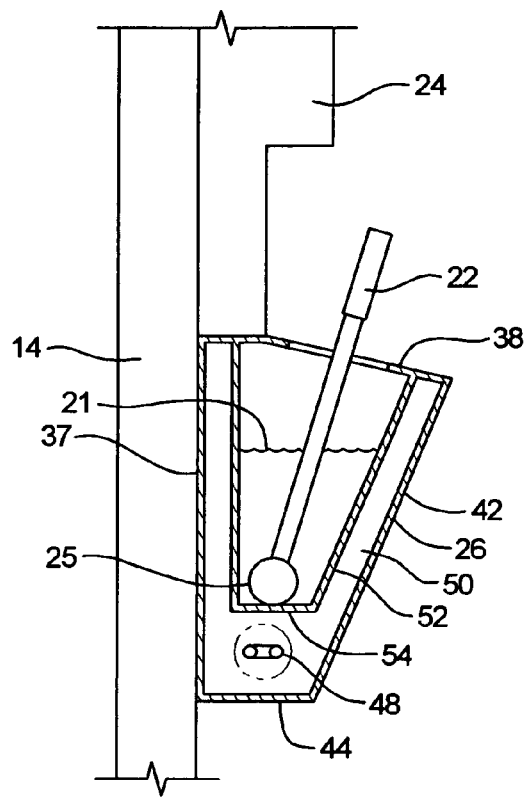
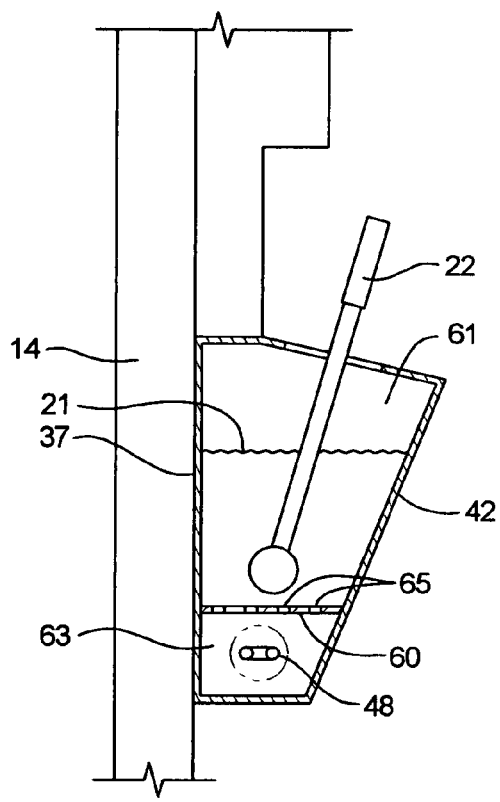

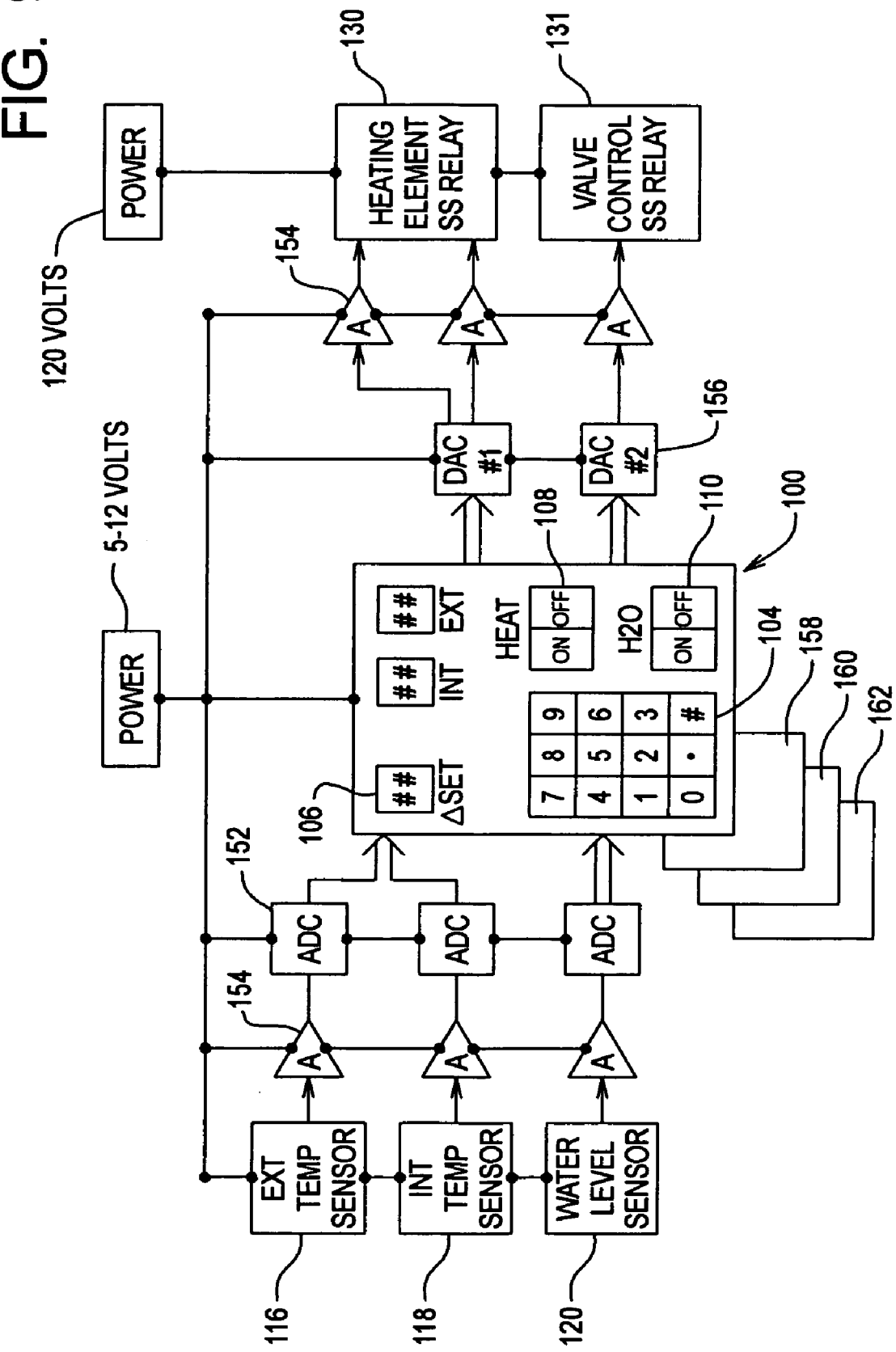

WINDSHIELD WIPER DISPENSER METHOD AND APPARATUS

RELATED APPLICATIONS

This application claims priority benefit of U.S. Ser. No. 60/638,245, filed Dec. 21, 2004.

BACKGROUND OF THE INVENTION a) Field of the Invention

The current embodiment relates generally to the standard windshield wiper dispensing containers found in many gas stations and service stations. More particularly, the current embodiment deals with windshield wiper dispensing units found in cold climates which have environment temperatures dropping below the freezing level and thus freezing the fluid within the standard windshield wiper dispensing unit. This concept relates directly to preventing the fluid contained within the windshield wiper dispensing unit from freezing during the cold winter months.

b) Background Art

The various prior art references discussed below fall into three general categories. One category is embodiments that show methods of automatically refilling windshield washer fluid at a service station. A second type of disclosure is a water heater that is submersible. The third type of disclosure is generally relating to windshield wiper fluid for the vehicle itself and replenishing the windshield wiper fluid. These various prior art references are discussed in detail below.

U.S. Pat. No. 6,585,011 (Willeke, Jr. et al.) shows a system for supplying windshield washer fluid to squeegee buckets at a service station. A fluid quantity sensor 214 is schematically shown in FIG. 2 that indicates whether the window washing fluid is low. As shown in FIGS. 4a-4c, there is a non-electrical system for maintaining fluid in the bucket 430. When the fluid level is sufficiently high, the spring 412 relaxes to a certain degree so the valve 420 shuts off the insertion of fluid into the open chamber region of the bucket 430. The other very schematic embodiments show other means for refilling the bucket with windshield washer fluid. For example, as shown in FIGS. 6a-6c, the system 480 has a switch where the low contact 492 engages the contact arm 488 when the fluid level is low. The contact arm 488 engages the high point 494 when the weight of the bucket 430 extends the opposite end of the contact arm 488 downwardly and the fluid dispersion through the squeegee bucket fluid tube 454 ceases. FIGS. 8-9 show a schematic perspective view of the apparatus in an operating environment. FIG. 10 shows a hose 508 and a nozzle 510 adapted to fill windshield wiper fluid of a vehicle.

U.S. Pat. No. 6,484,907 (Evans) shows a portable fluid dispensing apparatus that generally comprises a fluid container 20 (see FIG. 2), an air compressor 40 (see FIG. 3), and a dispenser gun 80 (see FIG. 5). Apparently, when the dispenser gun is activated the pressure within the container is decreased. The decrease in pressure is detected by a pressure switch which then activates the air compressor. The air compressor is in communication with the inner sealed region of the container 20 and maintains a sufficiently high pressure therein to continue dispensing fluid.

U.S. Pat. No. 6,283,656 (Jiang) shows a handheld deicer that has a sprayer which ejects antifreeze liquid onto the windshield of a car. A brush, scraper, sponge or squeegee are interchangeably mounted onto the nozzle region (see FIG. 11). In one form, a heater is placed in the nozzle where an electrical current is adapted to heat the nozzle region. FIG. 9 shows an embodiment with two compartments for chemical heating. When the two liquids 44 and 46 meet in the passageway of the nozzle 52 and mix before injecting up the opening 56, a chemical reaction between the two chemicals is exothermic whereby creating heat.

U.S. Pat. No. 5,257,423 (Cobsen et al.) shows a service island wash station enclosure adapted to be located in a service island at a gas station (see FIG. 1). A central wash station is employed so the patron can presumably just fill their car with gasoline and then wash their hands. The disclosure discusses hot air hair dryers, warm water dispensers and the like.

U.S. Pat. No. 4,759,470 (Jacobs) shows an automobile windshield washing unit where as shown in FIG. 2, the unit is cross-sectionally shown where the upper portion is substantially symmetric to lower portion about a middle horizontal plane. As shown in FIG. 1, the upper portion of the unit 10 is adapted to dispense towels and the lower portion houses the lower bin which in turn holds the washing solvent and the squeegee 38.

U.S. Pat. No. 4,480,173 (Butterfield) discloses a water heater that is adapted to heat water to various temperatures. The water heater in general includes a water level indicator, temperature sensor and other various components. The sole figure in the application schematically shows a water heater arrangement.

U.S. Pat. No. 4,143,792 (Rex) discloses a windshield washing apparatus having two bins as shown in FIG. 1. A paper towel distributing apparatus 18 is shown in the upper portion. As recited in column 2, line 43 either of the multipurpose bins 20 and 22 can be used as a receptacle for spent paper towels.

U.S. Pat. No. 4,068,116 (McKinstry) shows and immersible water heater that is adapted to be used with animal watering buckets. The heater has a heating element and a temperature-sensing member that cooperates with a thermostat. FIG. 1 shows the apparatus in use in an operating environment.

U.S. Pat. No. 4,000,835 (Bassett et al.) discloses a windshield washer service apparatus. As shown in FIG. 1, the automobile's reservoir 70 is shown where the hose 66 is in communication with the cabinet 20 and is dispensing windshield wiper fluid therefrom.

U.S. Pat. No. 3,594,849 (Coshow) discloses an apparatus for cleaning a surface such as a windshield. As shown in FIG. 4, the cleaning head means 4 is being applied to the windshield 70. The disclosure is directed towards a cleaning apparatus that employs a suction section that is adapted to remove debris from the surface to be cleaned.

BRIEF DESCRIPTION OF THE DRAWINGS

FIG. 3 shows a cross-sectional view of a windshield wiper solution dispenser unit;

FIG. 4 shows an alternative cross-sectional view of the windshield wiper solution dispenser unit;

FIG. 9 shows a control diagram of the digital hardware;

DETAILED DESCRIPTION OF THE PREFERRED EMBODIMENTS

The environment within which the present embodiment operates will be provided first, followed by the present embodiment itself. After discussion of the elements of the present embodiment, discussion of the operation of the present embodiment will be provided.

The present embodiment generally relates to windshield wiper dispensers which hold wiper solution and squeegees and are commonly found at gas stations and/or convenience stores. Generally, these windshield wiper dispenser containers are positioned outside next to the gas pumps themselves, and have both a washer-solution-containing section and a paper towel wiping section. These windshield wiper containers are generally exposed to the elements on a 24-hour basis. Consequently, during extremely low temperatures, the solution contained within the windshield wiper solution container can freeze with or without the squeegee held within the solution, thus making the windshield wiper dispenser container inoperable until the outside temperature rises above the freezing level. After the outside ambient temperature is raised above freezing, the solution still has to thaw out, which takes time based on the warmth of the ambient air temperature outside of the container.

There will now be a general discussion of the present concept as used in the gas station and service station 10 environment. This will be followed by a more detailed discussion of the particular control elements of the concept as they apply within the environment.

Figure 1:
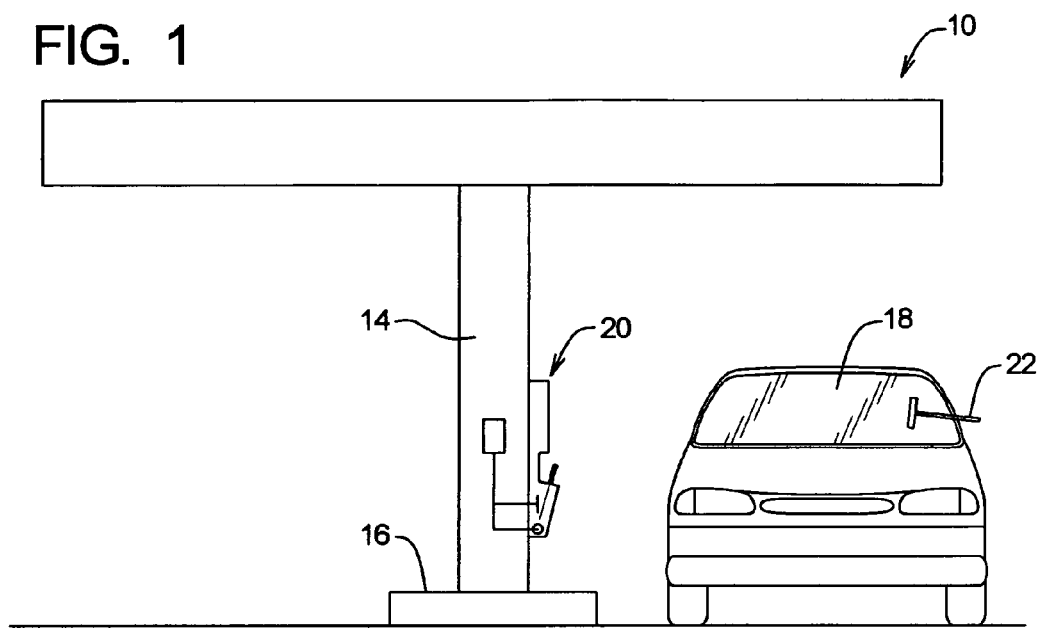
FIG. 1 shows an elevational view of a typical service station.

Referring now to FIG. 1, in general the concept of a windshield wiper solution dispenser is used in gas stations and service stations 10. In climates where temperatures fall below freezing, the windshield wiper solution dispenser 20 will generally have the wiper solution frozen due to exposure to the outside elements. Ready access during the winter months of a nonfrozen wiper solution held within a windshield wiper solution dispenser 20 is beneficial to and consistent with the idea of convenience and service at the gas station 10. Still referring to FIG. 1, the general operation and use of the windshield wiper solution dispenser 20 includes the windshield wiper solution dispenser positioned on the column 14 of the gas or service station 10.

Alternatively, the windshield wiper solution dispenser 20 can be incorporated within an ashtray/garbage can ground unit which has the ashtray on the top portion of the island or trash can, the interior volume of the island holds the trash can, and the windshield wiper dispenser is positioned along with the towel dispenser on the outside face or within an interior volume portion of the trash can island.

Generally, the dispenser 20 is located within the pump station island 16 and is either located on the trash cans or next to the gas station pumps. The user can pull the squeegee 22 out of the dispenser 20, and using the liquid solution contained within the squeegee 22, clean the windshield 18 of the automobile. Of course, if the solution within the dispenser 20 is frozen, the squeegee 22 may be fixed in the solution itself, and thus frozen in a single block within the windshield wiper solution dispenser 20. As a practical matter, extracting the squeegee during temperatures below freezing for the remainder of the cold season may require the gas station attendant to disassemble the dispenser 20 and place it in a warm environment such as the inside of the gas station 10, or utilize some heating elements to heat the solution and extract the squeegee.

Figure 2:
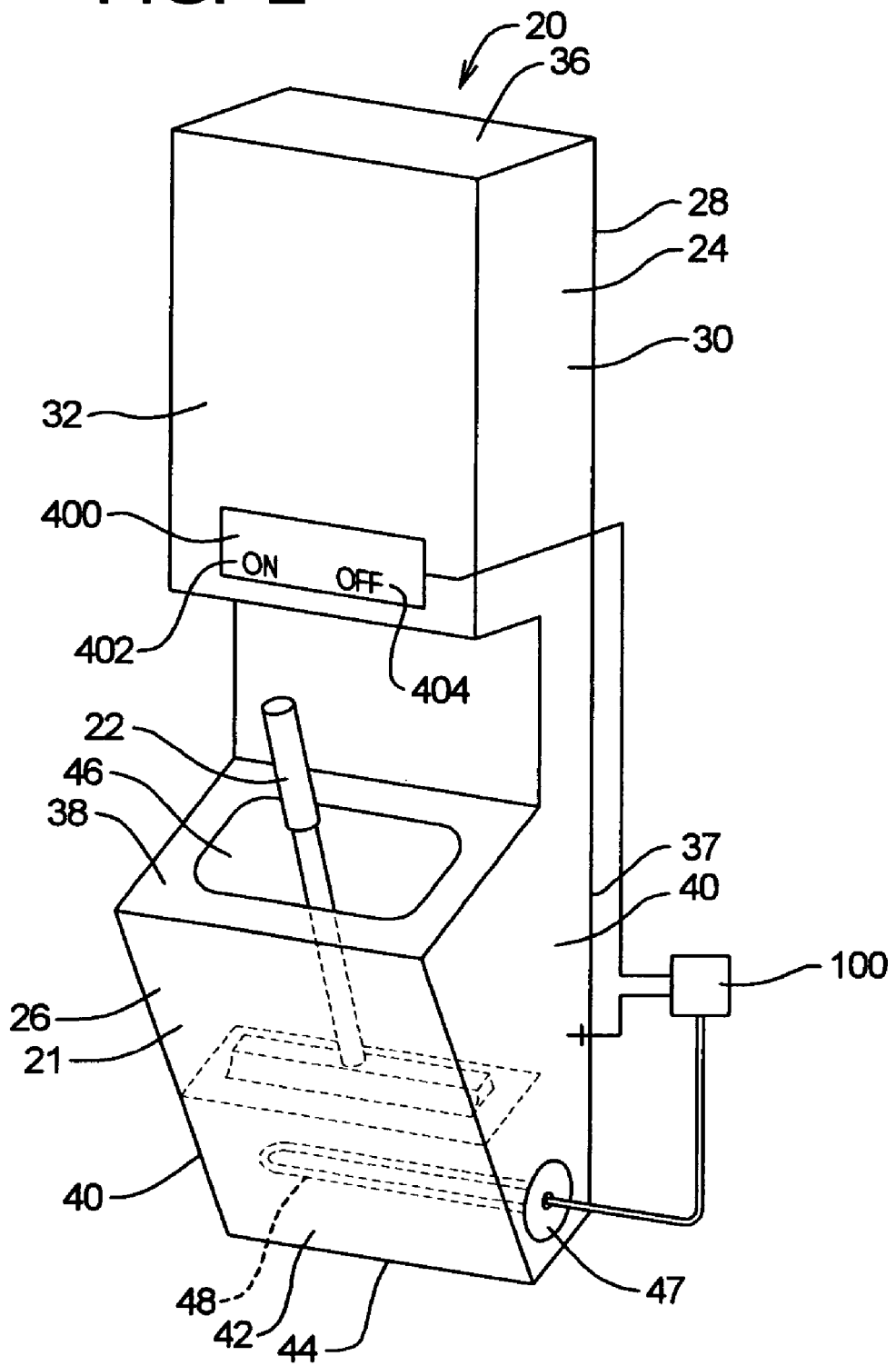
FIG. 2 shows a perspective view of a windshield wiper solution dispenser unit.

Thus, having the ability to utilize the squeegee 22 with the solution 21 in its liquid form during outside freezing temperatures, as seen in FIG. 2, will be beneficial to the convenience and use of the service station 10.

To provide this heating of the windshield wiper dispenser solution 21, a system to regulate the water temperature within the solution dispenser 20 is provided. Referring to FIG. 2, a typical solution dispenser 20 is constructed out of a polyvinyl chloride frame material or some sort of aluminum sheeting material with an interior frame.

While the following description of the solution dispenser 20 is provided for a unit which is mountable on a gas station stanchion or column of the overhanging parapet roof-protecting structure, other differently configured solution dispensers being designed for inclusion in previously mentioned island trash cans or other movable semi permanent components of the service station island are readily conceived.

Generally, the top portion of the dispenser 20 has a paper towel dispenser section 24, with the bottom portion of the dispenser unit 20 having a solution containing section 26. Contained within the solution containing section 26 is the wiper solution 21 as well as the squeegee or wiping mechanism 22. In the present configuration, the dispenser unit 20 has a dispenser front wall 32, paper dispenser sidewalls 30, a paper dispenser top wall 36, and a back wall 28. Similarly, the solution dispenser or containing section 26 has an angled front wall 42, as well as parallel solution container sidewalls 40, a solution container top wall 38, and a back wall 37. The solution container section 26 has an inner chamber which is defined by the aforementioned walls, and access to the inner chamber is through the top portion of the solution container top wall 38. Access is achieved through the top wall squeegee port 46, which is an opening within the solution container top wall 38.

In the current embodiment, a heating element 48 is provided at the bottom portion of the solution containing section 26 and is connected to a temperature control system which will be discussed below.

Various heating elements can be utilized; two are detailed in particular below. Of the heating elements possible to be used to maintain the liquid phase of the solution, a heating coil element which utilizes an electrical resistance path can be used, also a Peltier thermoelectric unit type system. Furthermore, a heating element which utilizes say for example a natural gas, propane, or other external fuel heating source (such as solar powered panels and the like) may be provided to heat the solution within the dispenser, or heat solution which can be circulated in and out of the interior of the dispenser. Likewise, a heating element liner similar in operation to electric blankets could be utilized to line the interior or exterior walls of the dispenser to maintain a liquid phase of the solution.

Still referring to FIG. 2, because it is common in the polar regions and colder regions of North and South America to expect the solution within the dispensers to be frozen during the water months, some form of indication to the customers at the service stations that the solution is available for use is needed to be provided on say for example the outside of the dispenser. Therefore, a heated solution indication light 400 is provided on the paper dispenser portion of the solution dispenser. The controller 100 will monitor the level of the solution within the container as well as the temperature of the solution and indicate the proper information on the display board or indication light 400. For example, having an on signal 402 and an off signal 404 would enable customers to recognize that the solution contained within the windshield wiper dispenser is available for usage. Ways of keeping the solution heated will now be discussed in further detail.

Figure 8A:
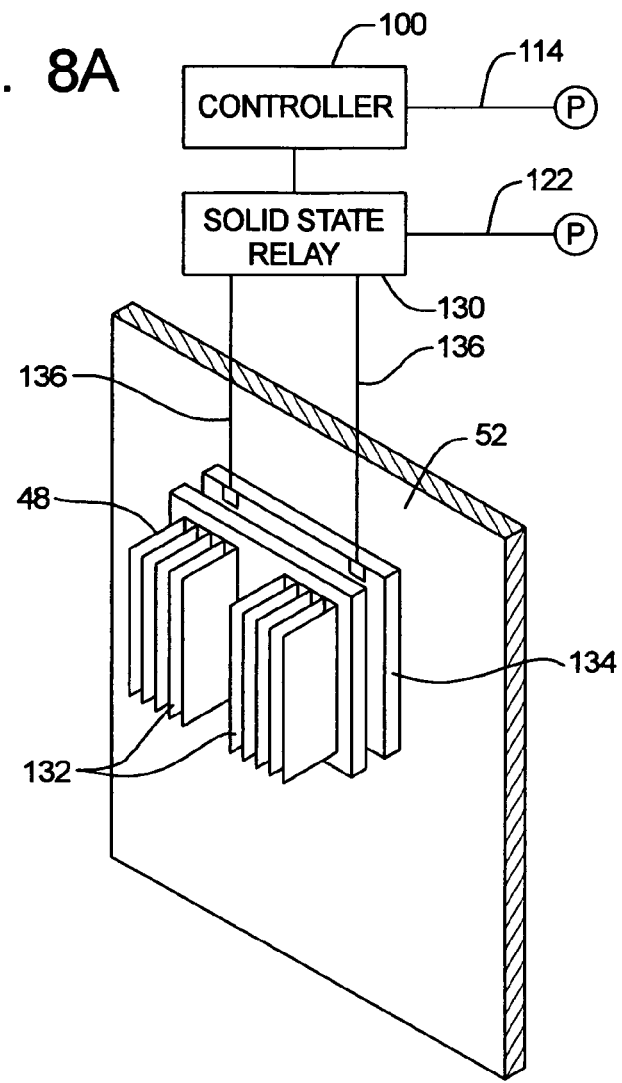
FIG. 8A shows a perspective view of the Peltier thermal electric unit.
Figure 8B:
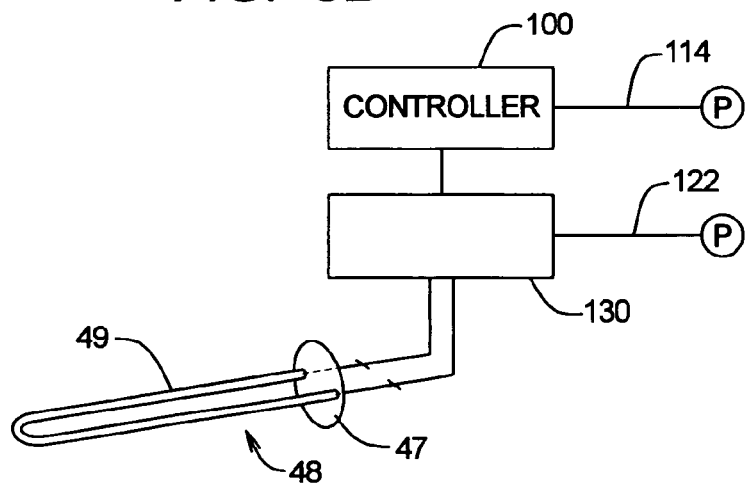
FIG. 8B the shows a perspective view of the heating coil unit.

As previously mentioned and referring to FIG. 3, different means of distributing the heat from the heating element 48 to keep the wiper solution 21 in its liquid state can be utilized. In the current embodiment, shown in FIG. 3, includes an inner solution containing wall 52 which holds the wiper solution 21. Separating the inner containing wall surface 52 from the outer containing wall surface 54 is an insulating airspace 50. Within this insulating airspace 50 is positioned the heating element 48. Referring briefly to FIG. 8B, the heating element 48 in the current embodiment as shown is provided with heating coils 49 which are connected to a watertight seal 47, and receive power from a 120-volt power supply routed through a solid-state relay 130. Control of the solid-state relay 130 is provided by a programmable logic controller 100 which will be discussed below.

Referring back to FIG. 3, the heating element 48, as shown in the current embodiment with resistance heating coils, is configured to be replaceable if and when maintenance requires that the heating coils be replaced. Thus, the heating element 48 can be removed laterally from the base of the solution containing section 26 by unscrewing the attachment means and removing the heating element 48.

Still referring to FIG. 3, the heating element is turned on and the heat is radiated into the insulating space 50, providing a relatively uniform temperature differential between the outside environment and the interior chamber of the solution containing section 26. The insulating airspace 50 can include not only the entire interior chamber of the solution containing section 26, but can be positioned at the bottom portion of the solution containing section 26, effectively creating a solid dividing wall or membrane 54 between the solution containing section 26 and the insulating airspace 50.

The solid dividing wall or membrane 54 can be constructed of a heat-conducting material such as an alloy or a polyvinyl type of plastic. Fins extending from the top face of the solid dividing wall 54 up into the interior section of the solution containing section 26 can also be provided to transmit heat.

Alternatively, referring to FIG. 4, a direct heat transfer from the heating element to the solution 21 can be provided. In this configuration, the divider is a porous divider or porous membrane 60 which enables the solution 21 to flow from the solution containing section top portion 61 into the solution containing section bottom portion 63. Convection currents within the solution 21 will naturally occur through the use of the heating element 48 as the heated solution 21 rises and the cold solution falls within the solution dispensing containing section 26, thus mixing the solution.

The porous divider 60, in one form, can have a plurality of holes 65 through which the solution 21 can flow. The porous divider 60 is substantially rigid enough to provide for support of the squeegee 22 as it rests within the interior chamber of the solution containing section 26.

Figure 5:
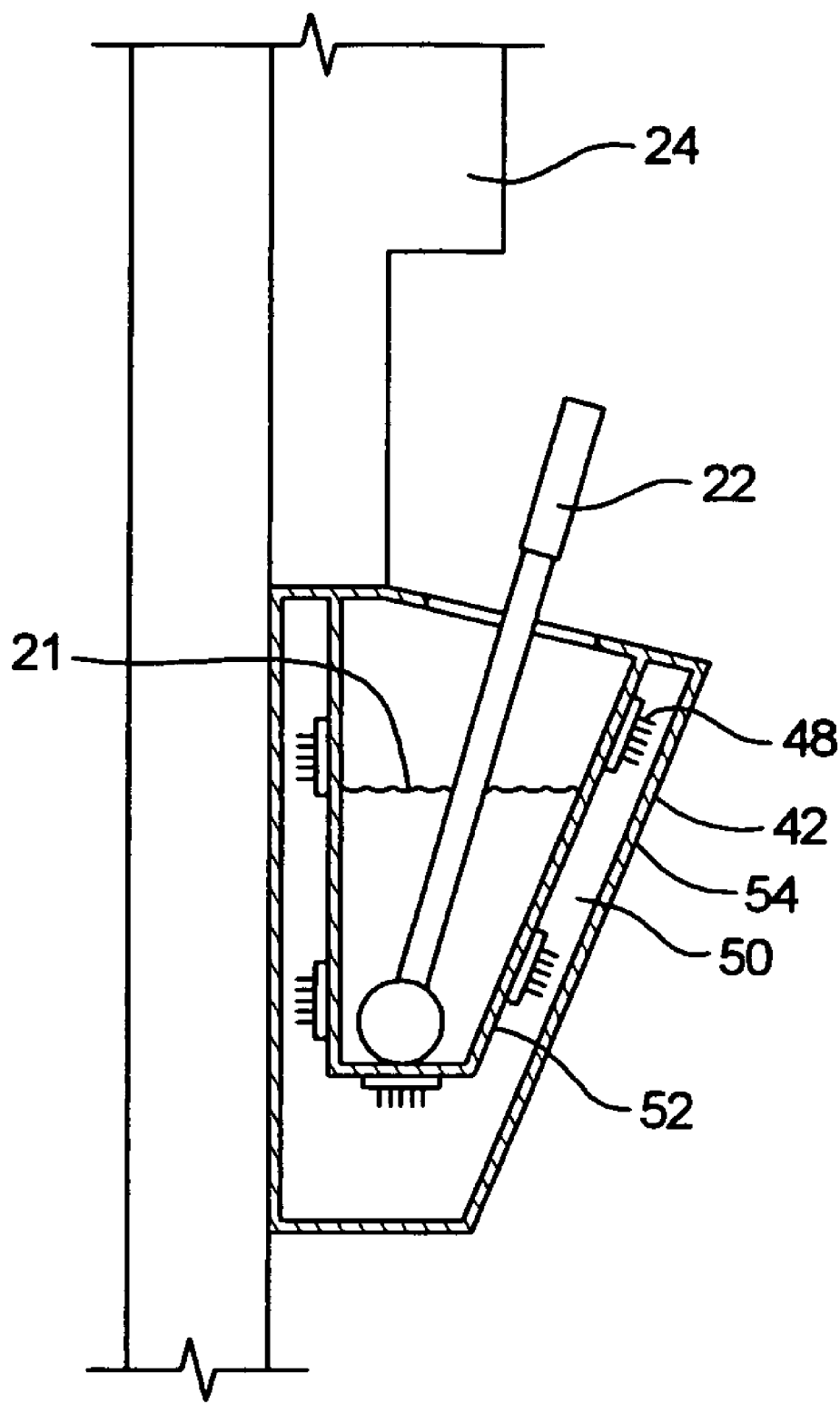
FIG. 5 shows an alternative cross-sectional view of the windshield wiper solution dispenser unit.

In an alternative embodiment, and referring to FIG. 5, in lieu of utilizing heating coils 49, the heating element 48 could conceivably use one or more Peltier thermal electric units. These thermal electric units 48 can be distributed along the inner containing wall surface 52 within the insulating airspace 50, or conceivably positioned on the bottom of the solution containing section 26 at the bottom wall 44. Referring briefly to FIG. 8A, the Peltier thermal electric heating element 48 may require a larger voltage power source than what the digital logic controller device 100 utilizes.

Consequently, a switching element such as a solid-state relay 130 is provided having a power source which provides at least 120 volts of power to the heating element 48. The Peltier thermal electric unit 48 has a plurality of cooling fins 132 which, in one embodiment, could extend up into the inner chamber region of the solution containing section 26. Thus heat from the thermal electric unit 48 would be disbursed into the solution 21. It is well known as a method within the art to use Peltier-type thermal electric coolers and heaters to provide temperature control to conditioned air spaces. In operation, a voltage applied to the free ends of two dissimilar conducting materials creates a temperature difference between the conducting materials.

Thus, there is a cool side and a hot side of the solid-state media. A typical thermal electric cooler or heater will consist of an array of positive and negative type elements that act as two dissimilar conductors. The array of elements is soldered between two ceramic plates or other heat gain and loss materials, and positioned electrically in series and thermally in parallel.

As the DC current passes through one or more pairs of the elements from negative to positive, there is a decrease in temperature at the cold side junction resulting in absorption of heat from the environment. Further, heat is carried through the elements and released on the opposite hot side junction as the electrons from the current move from a high to low energy state. Thus, the heat gain and release capacity is proportional to the current and the number of conducting elements.

Therefore, to produce the required heat generation, a reasonable amount of voltage 122 needs to be provided from the solid-state relay 130 and conducted through the current leads 136 and transferred between the conducting materials 134 to produce the desired heating effect.

Referring back to FIG. 5, the Peltier thermal electric unit 48 can be positioned as required along the outside face of the inner dispensing wall 52, thus providing a relatively uniform dispersion of thermal heat gain into the inner containing region of the solution containing section 26.

In addition to heating of the windshield wiper solution 21, monitoring and filling of the wiper solution 21 level within the solution containing section 26 can also be provided.

Figure 6:
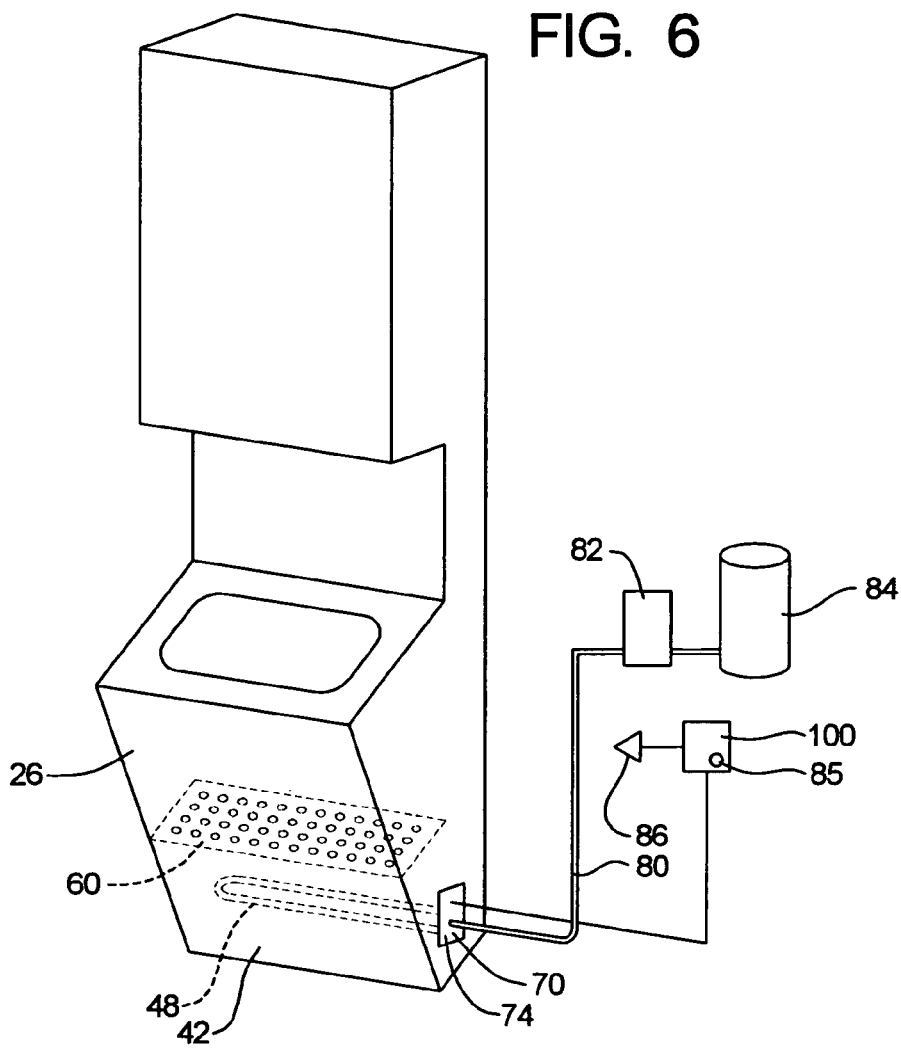
FIG. 6 shows a perspective view of a windshield wiper solution dispenser unit with temperature and solution controller.

Referring to FIG. 6, a solution feed conduit is connected to the bottom portion of the solution containing section 26 to provide additional recharging of the windshield wiper solution 21 into the containing section. To monitor and control the solution level, additional control is provided within the programmable logic controller 100 along with a solution pump 82, and the solution tank 84. The controller operates a solution valve 86 and also provides a low level indication light 85 if the solution containing section 26 needs to be recharged manually.

Figure 6A:
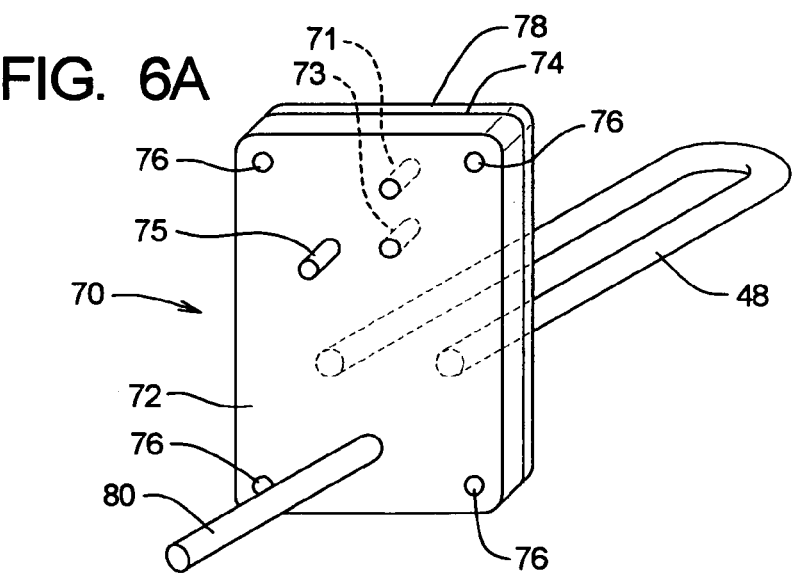
FIG. 6A shows a perspective view of a seal plate.

In one configuration, the monitoring of the windshield wiper solution 21 within the containing section 26 is performed at the seal plate 70 as seen in both FIGS. 6 and 6A.

The seal plate 70 is in one embodiment constructed of a hard polyvinyl chloride or plastic material having attachment means such as screw holes that will attach to the outer surface of the solution containing section 26. To provide a watertight seal, a sealing gasket 78 can be included on the back or rear surface 74 of the seal plate 70.

The solution feed conduit 80 is directed through the seal plate 70 and provides the required influx of new windshield wiper solution 21 into the containing section 26. Also mounted to the rear surface 74 of the seal plate 70 are water level sensors 73 and interior temperature sensors 71, as well as an outside or exterior temperature sensor 75. Optionally connected to the seal plate 70 is the removable heating element 48. In the current configuration, the heating element 48 is shown as the heating coil as previously discussed.

Figure 7:
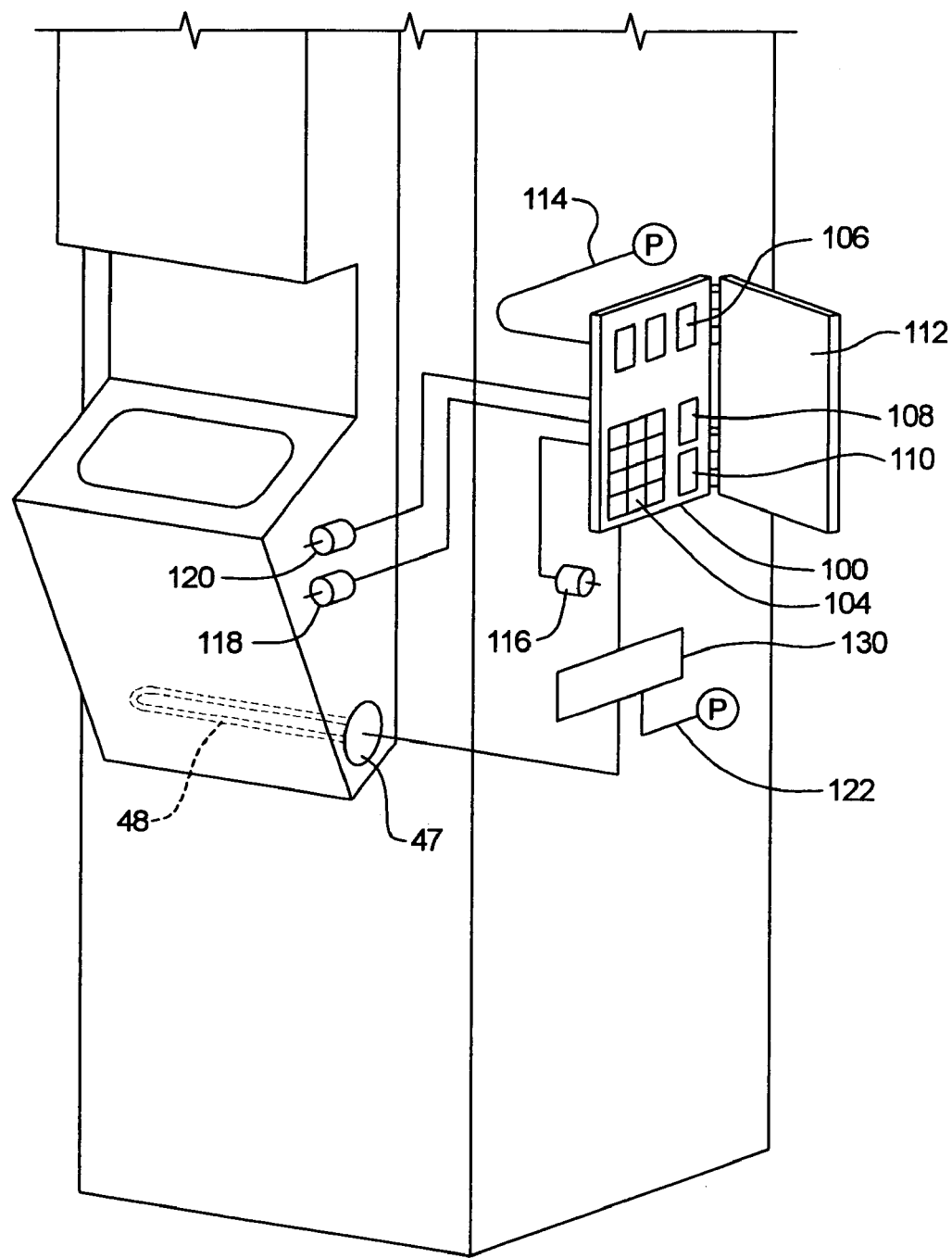
FIG. 7 shows a perspective view of the programmable logic controller mounted on the service station column.

Referring to FIG. 7, an exterior view of the control system is shown with the controller 100 attached to the outside face of the gas station or service station column 14. To keep the controller 100 operational, a power line 114 is provided. Additionally, the exterior configuration of the controller 100 includes a controller cover 112, a plurality of LED display lights 106, an on-off heating control unit 108, and an on-off solution pump control unit 110.

The controller cover 112 is attached via a plurality of hinges along the vertical edge of the controller case. To enter in the required temperature limits for the solution 21, a digital keypad 14 is provided. Power is also connected to the solid state relay 130 as well as to the heating element 48. Electrical connections are provided to the solution level gauge 120, the inside temperature sensor 118, and the outside temperature sensor 116.

Control of the temperature in one form can be provided by a programmable logic controller as seen in FIG. 9. This programmable logic controller 100 is required to take analog signals and convert them into digital signals, and then after performing the required control logic based on the various exterior signals, provide analog signals to the various analog control devices for operation of the machinery.

Thus, the control hardware as previously mentioned is comprised of the exterior temperature sensor 116, the interior temperature sensor 118, and the water level sensor 120. A plurality of amplifiers 154 are provided to filter the exterior analog signals to the required amplitude level for the analog-to-digital converters 152. The analog-to-digital converters then provide the digital signal to the programmable logic control processor 160.

The digital and software logic is performed within the programmable logic controller 100, and control signals are digitally sent to the analog controllers. The digital-to-analog converters 156 provide conversion from the digital signal to analog signal and then a plurality of amplifiers increase the amplitude of the analog signal to the required amplitude for controlling the solid state relay 130 as well as the pump valve control solid state relay 131. To operate the programmable logic controller 100, a power source 114 is provided with at least between 5 and 12 volts of power. Additionally, a 120-volt power source 122 is provided for the heating element solid state relay 130 as well as the valve control solid-state relay 131.

Still referring to FIG. 9, the user interface controls of the programmable logic controller 100 include a digital keypad 104, the heat control 108, and the water flow control 110. The user has the option of in this particular embodiment, setting the desired temperature differential between the interior solution-containing section 26 and the exterior temperature or outside temperature sensor 116.

This desired temperature setting is then stored in the memory chip 158 of the programmable logic device 100.

Still referring to FIG. 9, the user interface controls of the programmable logic controller 100 includes a digital keypad 104, the heat control 108, and the water flow control 110. The user has the option of in this particular embodiment, setting the desired temperature differential between the interior solution containing section 26 and the exterior temperature or outside temperature sensor 116.

This desired temperature setting is then stored in the memory chip 158 of the programmable logic devices 100.

In operation, the programmable logic device 100 reads the desired temperature setting and displays the internal temperature as well as the external temperature and the setting on the LED displays 106. The logic device then compares the internal temperature reading to the internal temperature setting, and sends the appropriate signal through the digital-to-analog converter 156 which then directs the electrical current flow on the thermal electric Peltier unit 48.

Figure 10:
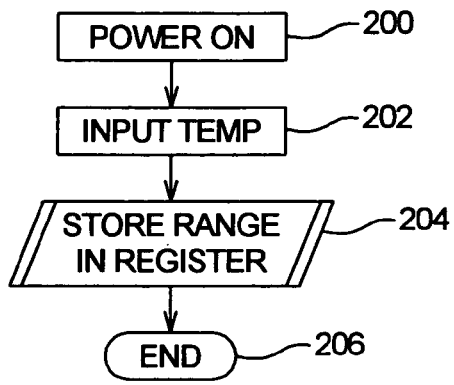
FIG. 10 shows a process diagram for setting the containing region temperature.
Figure 11:
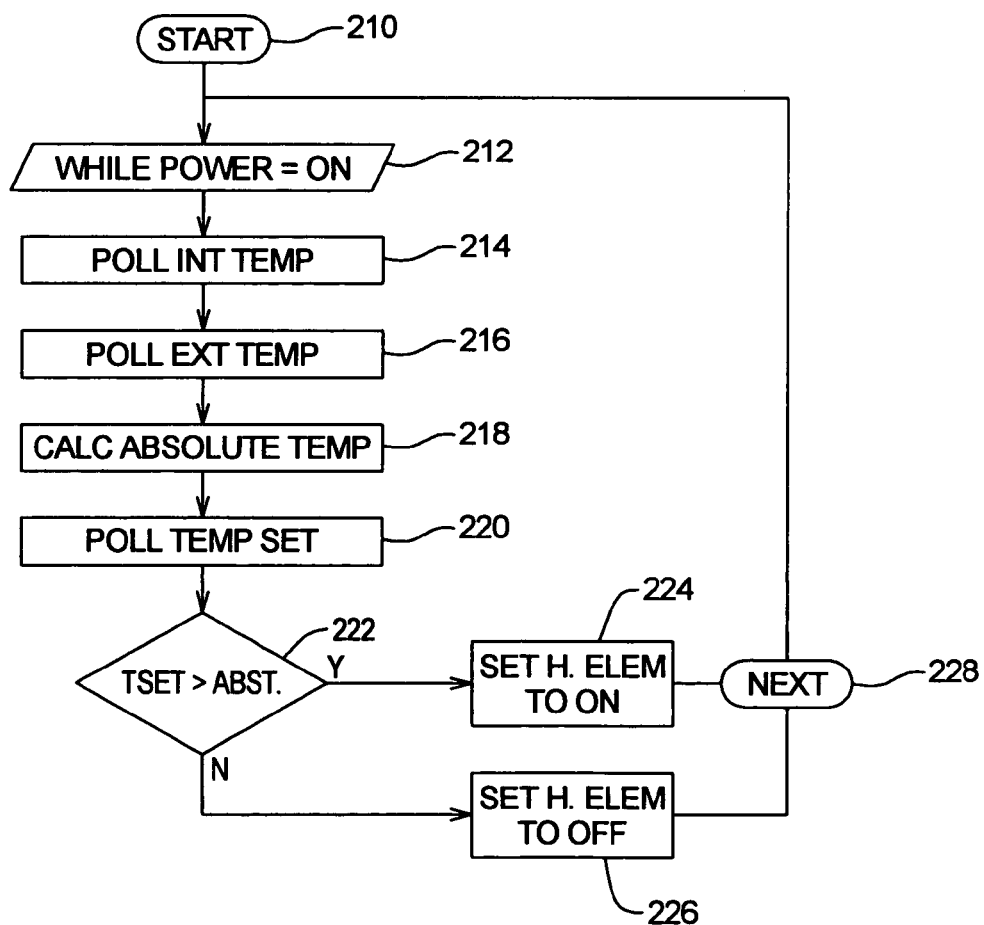
FIG. 11 shows a process diagram for the temperature adjustment control logic.

Referring now to FIGS. 10 and 11, a brief description of the data process flow will now be provided. The user will choose to power on at step 200 the programmable logic controller 100 and input the desired temperature setting at step 202. The data is then stored in the programmable logic controller 100 at step 204 and the setting of the interior temperature range is complete.

Once the desired internal temperature of the solution containing section 26 is stored, then the programmable logic controller 100 can perform the digital logic to determine whether or not to send a heating control signal to the heating element solid state relay 130 and thus power on the heating element 48.

This process is shown in FIG. 11. The process starts at step 210 and performs a while loop at step 212, constantly polling the interior temperature at step 214. Further, the programmable logic controller 100 also polls the temperature signals at step 216; thereafter, the digital logic performs a simple calculation to determine the absolute temperature differential between the interior and exterior of the solution containing region 26 at step 218.

Concurrently, the programmable logic controller 100 polls the recorded temperature setting at step 220. Thereafter, the digital logic performs a decision block at step 222, comparing the temperature set variable with the absolute temperature variable. If the temperature set is greater than the absolute temperature, the programmable logic controller 100 sends a digital signal to the heating element solid state relay 130 to turn the heating current on at step 224. The while loop then continues at step 220.

If the temperature setting is not greater than but less than or equal to the absolute temperature at step decision block 222, then the programmable logic controller 100 sends the digital signal to the heating element solid state relay 130 to turn off the electrical current to the heating element 48 at step 226. The while loop is then continued at step 228 until the power to the programmable logic controller 100 is turned off.

Figure 12:
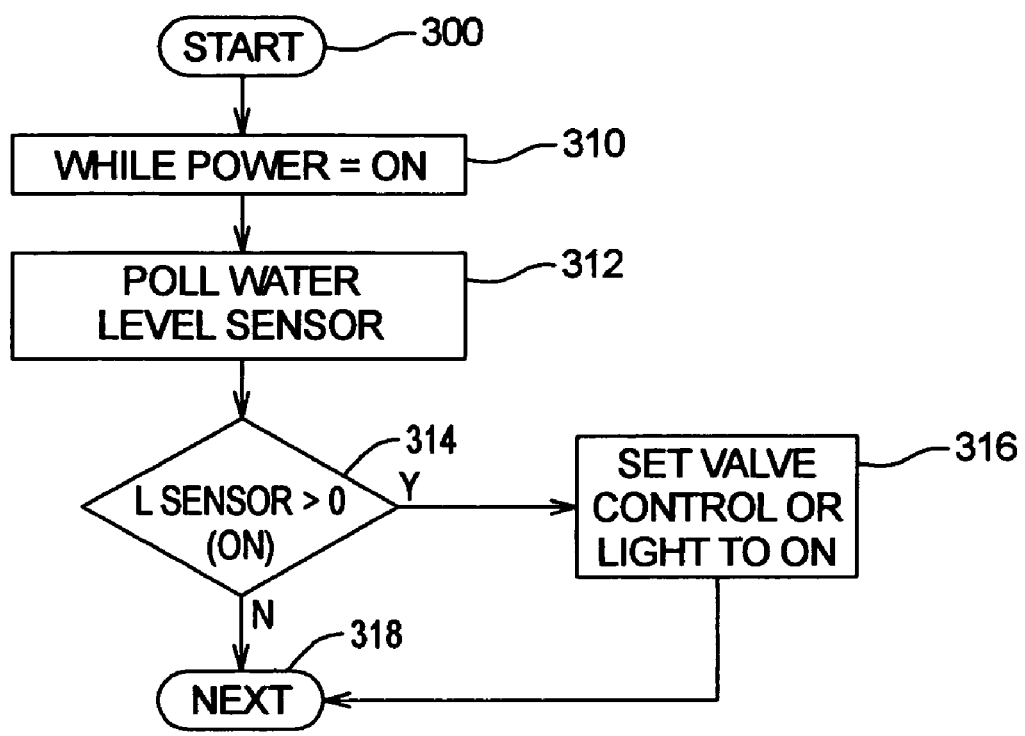
FIG. 12 shows a process diagram for the water level adjustment control logic.

Similarly, the logic for operating the solution level control is as follows and is shown in FIG. 12. Starting at step 300, a while loop is performed when the power at step 310 is on. The digital logic controller 100 polls the water level sensor at step 312. If the water level sensor is greater than zero, meaning that the sensor indicates a low water level, then a decision block is performed at step 314 and the valve control solid state relay at step 316 as well as an indication light is set to "On." The loop continues at step 318. If the water level sensor is not set to "On," then the loop continues to poll the water level sensor while the power is on.

We claim:

1. An apparatus to maintain the temperature of solution in a liquid state during outside freezing temperatures, said solution located at a vehicle servicing station or fuel station, said solution for cleaning vehicle windows or windshields, said apparatus comprising:
   a. a solution containing section to retain the solution in its liquid state;
   b. a heating element configured to heat the solution contained within the solution containing section;
   c. said heating element further comprising a liner having electric heating coils for transmitting thermal heat from the electrical current resistance; said liner further comprising: a malleable outer lining enabling said liner to configure to said containing section.

2. The apparatus according to claim 1 wherein said apparatus further comprises a heat controller configured to regulate the amount of heat transmitted from the heating element into the solution.

3. The apparatus according to claim 1 wherein said solution containing section further comprises: a first containing portion and a second containing portion, said heating element substantially contained within said second containing portion.

4. The apparatus according to claim 3 wherein said solution containing section further comprises: said first containing portion and said second containing portion separated by a porous membrane, whereby said solution in the solution containing section can circulate between said first containing portion and said second containing portion and be heated by said heating element contained substantially within said second containing portion.

5. The apparatus according to claim 3 wherein said solution containing section further comprises: said first containing portion and said second containing portion separated by a solid membrane, whereby said solution in the solution containing section is retained in said first containing portion and the heating element is contained within said second containing portion and radiates heat through said solid membrane to maintain the temperature of the solution.

6. The apparatus according to claim 4 wherein said porous membrane further comprises a plurality of openings large enough to provide solution flow between the first containing portion and the second containing portion but small enough to keep a majority of debris in the first containing portion from passing into the second containing portion.

7. A system to maintain the temperature of solution in a liquid state during outside freezing temperatures, said solution located at a vehicle servicing station or fuel station, said solution for cleaning vehicle windows and windshields, said system comprising:
   a. a solution containing section configured to retain the solution;
   b. a heating element configured to heat the solution;
   c. a controller configured to regulate the heating element;
   d. said controller further comprising:
      i. a programmable logic controller configured to send, receive, store, calculate and display digital information;
      ii. an exterior temperature sensor configured to read the outside temperature and send an exterior temperature signal;
      iii. an interior temperature sensor configured to read the temperature of the solution contained within said solution containing section and send an interior temperature signal;
      iv. a solid-state relay configured to control one or more heating elements, receive a control signal from said programmable logic controller;
      v. a power source providing power to: said programmable logic controller, said exterior temperature sensor, said interior temperature sensor, said solid-state relay, said heating elements;
      vi. whereby said programmable logic controller receives an interior temperature signal, an exterior temperature signal, stores said interior temperature signal and exterior temperature signal, calculates the difference in temperature between the interior temperature signal and the exterior temperature signal, sends a control signal to the solid-state relay to power on the heating element or power off the heating element.

8. The system according to claim 7 wherein said controller further comprises a variable switch to adjust the amount of heat generated by the heating element.

9. The system according to claim 7 wherein said system further comprises: a solution conduit configured to refill the solution containing section with additional solution.

10. The system according to claim 7 wherein said controller further comprises a solution level gauge to monitor the amount of solution contained within said solution-containing section.

11. The apparatus according to claim 7 wherein said heating element further comprises a coiled loop.

12. The apparatus according to claim 7 wherein said heating element further comprises a submersible resistance heating coil.

13. The system according to claim 8 wherein said system further comprises:
   a. said heating element comprising a current resistant heating coil;
   b. said variable switch comprising a means for increasing and reducing the electrical current running through said current resistant heating coil.

14. The apparatus according to claim 7 wherein said containing section further comprises a first containing portion and a second containing portion, said first containing portion separated from said second containing portion by a porous membrane, said heating element further comprising a resistance heating coil positioned within said second containing portion; said heating controller configured to regulate said resistance heating coil.

15. The apparatus according to claim 7 wherein said apparatus further comprises said heating element positioned adjacent to said solution containing section; a circulating conduit configured to connect said solution containing section to said heating element; whereby the solution contained within said solution containing section circulates through said circulating conduit into said heating element, said heating element heating said solution, said solution circulating out of said heating element through the circulating conduit and into said solution containing section.

16. The apparatus according to claim 15 wherein said heating element further comprises a solution filter to clean said solution circulated through said heating element.

17. The apparatus according to claim 16 wherein said heating element further comprises a circulating pump to circulate the solution from said solution containing section through said circulating conduit into said heating element and back through said circulating conduit into said solution containing section.

18. The apparatus according to claim 7 wherein said heating element is further comprised of one or more of the following:
   a. a resistant heating coil;
   b. a Peltier thermal electric heating system;
   c. a natural gas heating system;
   d. a fossil fuel heating system;
   e. a solar panel heating system.

19. The apparatus according to claim 7 wherein said apparatus further comprises a display section to convey to a solution user the availability of the solution in a liquid state within the solution containing section for use in cleaning vehicle windows and windshields during outside freezing temperatures.

20. An apparatus to maintain the temperature of solution in a liquid state during outside freezing temperatures, said solution located at a vehicle servicing station or fuel station, said solution for cleaning vehicle windows or windshields, said apparatus comprising:
   a. a solution containing section comprising: a first containing portion and a second containing portion, said first containing portion and second containing portions separated by a membrane said first containing portion configured to retain said solution;
   b. a heating element comprising one or more of the following:
      i. a resistant heating coil; a Peltier thermoelectric heating system; a natural gas heating system; a fossil fuel heating system; a solar panel heating system;
      ii. said heating element communicating heat from said second containing portion into said first containing portion;
   c. a controller comprising a regulator to control the amount of heat transmitted from the heating element said controller further comprising:
      i. a programmable logic controller configured to send, receive, store, calculate and display digital information;
      ii. an exterior temperature sensor configured to read the outside temperature and send an exterior temperature signal;
      iii. an interior temperature sensor configured to read the temperature of the solution contained within said solution containing section and send an interior temperature signal;
      iv. a solid-state relay configured to control one or more heating elements, receive a control signal from said programmable logic controller;
      v. a power source providing power to: said programmable logic controller, said exterior temperature sensor, said interior temperature sensor, said solid-state relay, said heating elements;
   d. a sensor to indicate the temperature of the solution contained within said first containing portion; said controller configured to read said sensor and adjust the regulator to control the amount of heat transmitted from the heating element;
   e. whereby the sensor indicating to said controller the interior temperature of said solution in said first containing portion, said controller adjusting the regulator to control the amount of heat transmitted from the heating element, said heating element communicating heat from the second containing portion through said membrane into the first containing portion, said heat maintaining the solution in the first containing portion in a liquid state during outside freezing temperatures.

* * * * *